(12) United States Patent
Li et al.

(10) Patent No.: US 10,134,317 B2
(45) Date of Patent: Nov. 20, 2018

(54) PROJECTION DEVICE, PROJECTION CONTROL SYSTEM, AND PROJECTION CONTROL METHOD

(71) Applicant: APPOTRONICS CHINA CORPORATION, Shenzhen (CN)

(72) Inventors: Yi Li, Pleasanton, CA (US); Zeqin Wang, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 0 days.

(21) Appl. No.: 15/548,395

(22) PCT Filed: Jan. 28, 2016

(86) PCT No.: PCT/CN2016/072438
§ 371 (c)(1),
(2) Date: Aug. 2, 2017

(87) PCT Pub. No.: WO2016/124094
PCT Pub. Date: Aug. 11, 2016

(65) Prior Publication Data
US 2018/0033357 A1 Feb. 1, 2018

(30) Foreign Application Priority Data
Feb. 5, 2015 (CN) .......................... 2015 1 0060703

(51) Int. Cl.
*H04N 9/31* (2006.01)
*G09G 3/00* (2006.01)
*G03B 33/08* (2006.01)
*G09G 3/34* (2006.01)

(52) U.S. Cl.
CPC .............. *G09G 3/007* (2013.01); *G03B 33/08* (2013.01); *H04N 9/31* (2013.01); *H04N 9/3155* (2013.01);
(Continued)

(58) Field of Classification Search
CPC .... H04N 9/315; H04N 9/3158; H04N 9/3188; H04N 9/3194; H04N 9/3108; H04N 9/31;
(Continued)

(56) References Cited

U.S. PATENT DOCUMENTS

| 8,287,133 B2 | 10/2012 | Watanabe et al. |
| 2007/0013871 A1 | 1/2007 | Marshall et al. |

(Continued)

FOREIGN PATENT DOCUMENTS

| CN | 101095184 A | 12/2007 |
| CN | 101929637 A | 12/2010 |

(Continued)

OTHER PUBLICATIONS

International Search Report in the parent PCT application No. PCT/CN2016/072438, dated Apr. 25, 2016.
(Continued)

*Primary Examiner* — Sherrie Hsia
(74) *Attorney, Agent, or Firm* — Chen Yoshimura LLP

(57) ABSTRACT

Provided is a projection device, comprising a light-emitting apparatus, a spatial light modulator, a pixel shifting apparatus, a projection lens, and a control processor; the light-emitting apparatus comprises an excitation light source, a colored-light generating apparatus, and a drive apparatus; the control processor is separately connected to the drive apparatus, the light source, the spatial light modulator, and the pixel shifting apparatus, and is used for: controlling the frequency of periodic motion of the drive apparatus; while the drive apparatus moves the conversion area of the colored-light generating apparatus to pass across the position illuminated by the excitation light, shutting off the light source or controlling the spatial light modulator to enter a non-projecting state. No light passes through the pixel shifting apparatus when it is changing states, thus it is
(Continued)

prevented from affecting the contrast. Also provided are a projection control system and a projection control method.

16 Claims, 5 Drawing Sheets

(52) U.S. Cl.
CPC ......... *H04N 9/3158* (2013.01); *H04N 9/3188* (2013.01); *H04N 9/3194* (2013.01); *G09G 3/3406* (2013.01); *G09G 2310/0235* (2013.01); *G09G 2310/0237* (2013.01); *G09G 2320/0238* (2013.01); *G09G 2320/0252* (2013.01); *G09G 2340/0414* (2013.01); *G09G 2340/0421* (2013.01)

(58) Field of Classification Search
CPC .... H04N 9/312; H04N 9/3141; H04N 9/3197; G09G 3/007; G09G 2320/0252
USPC ....... 348/742, 743, 744, 759, 766, 770, 771, 348/790, 580; 353/31, 34, 37; 345/56
See application file for complete search history.

(56) References Cited

U.S. PATENT DOCUMENTS

| | | | |
|---|---|---|---|
| 2007/0236616 A1* | 10/2007 | Pettitt | G02B 26/008 348/743 |
| 2008/0151356 A1 | 6/2008 | Fujita et al. | |
| 2009/0115917 A1* | 5/2009 | Horikawa | G02B 26/0841 348/745 |
| 2010/0283977 A1 | 11/2010 | Wang et al. | |
| 2011/0090465 A1 | 4/2011 | Watanabe et al. | |

FOREIGN PATENT DOCUMENTS

| CN | 102043314 A | 5/2011 |
|---|---|---|
| EP | 0751683 A2 | 1/1997 |
| JP | 2004-180011 A | 6/2004 |
| JP | 2006146036 A | 6/2006 |
| JP | 2007-163943 A | 6/2007 |
| JP | 2008139700 A | 6/2008 |

OTHER PUBLICATIONS

IPRP in the parent PCT application No. PCT/CN2016/072438, dated Aug. 8, 2017.
Japanese Office Action, dated May 29, 2018 in a counterpart Japanese patent application, No. JP 2017-540842.
Chinese Office Action, dated Aug. 25, 2017, and Search Report dated Aug. 17, 2017, in a counterpart Chinese patent application, No. CN 201510060703.8.
Chinese Office Action, dated Jun. 11, 2018 in a counterpart Chinese patent application, No. CN 201510060703.8.

* cited by examiner

PROJECTION DEVICE, PROJECTION CONTROL SYSTEM, AND PROJECTION CONTROL METHOD

BACKGROUND OF THE INVENTION

Field of the Invention

This invention relates to projection technologies, and in particular, it relates to a projection device, projection control system and projection control method.

Description of Related Art

In recent years, with the development of display technologies, people have increasing expectations for image display quality of display devices. Increasing the resolution of a display is considered an effective way to improve image display quality. In the projection area, 4K2K spatial light modulator panels based on LCOS (Liquid Crystal On Silicon) and LCD (Liquid Crystal Display) technologies have been developed. 4K2K is a term used in the display area, generally referring to a high display resolution of approximately 4K pixels in the horizontal direction and approximately 2K pixels in the vertical direction, for example, a resolution of 3840×2160 pixels. However, such panels are still relatively expensive. 4K2K panels based on DLP (Digital Light Processing) are still not available due to difficulties in structural designs or manufacturing.

SUMMARY

For cost concerns, JVC (Victor Company of Japan, Limited) developed e-shift (pixel shifting) technology to realize 4K2K display. This technology uses a 2K1K spatial light modulator panel, and uses an e-shift device to shift the image pixels in a diagonal direction by one half of a pixel size, to realize 4K2K display. 2K1K is a term used in the display area, generally referring to a resolution of approximately 2K pixels in the horizontal direction and approximately 1K pixels in the vertical direction, for example, a resolution of 1920×1080 pixels. This technology utilizes polarization light panels (LCOS or LCD), and the e-shift device can be implemented by electro-optical effect, magneto-optical effect, or acousto-optic effect. The switching speeds of these e-shift implementations are very fast, i.e., the diagonal shifting speed is very fast and can satisfy the requirement of display.

Some manufacturers have applied e-shift technology to DLP projection devices, to increase their image resolution. As shown in FIG. 1, which illustrates the working principle of an e-shift device manufactured by TI (Texas Instruments). This technology uses a spinning glass plate 100 to achieve the diagonal shifting of pixels by one half of a pixel size. Assuming that the size of a pixel is 5.4 microns, then the diagonal shift of one half of a pixel size is 3.818 microns. Assuming that the material of the glass plate is BK7 and its thickness is 0.7 mm, then the glass plate needs to be rotated by approximately 0.92 degrees. Because the glass plate is not a micro structure, its rotation is not very fast, and typically requires 0.5 msec to rotate the above angle. Thus, it is not easy to achieve fast speed when using the e-shift technology in DLP projection devices. Also, it has been shown that when used in DLP projectors, the image enhancement effect of e-shift devices limited.

Accordingly, the present invention is directed to a projection device, projection control system and projection control method that can improve display quality of DLP projection devices.

In one aspect, the present invention provides a projection device, which includes: an image light generating device, for generating an image light for forming a projected image; a pixel shifting device, disposed on a transmission path of the image light generated by the image light generating device, the pixel shifting device being configured to switch its state between a first state and a second state, wherein a first projected image formed after the image light passes through the pixel shifting device when the pixel shifting device is in the first state and a second projected image formed after the image light passes through the pixel shifting device when the pixel shifting device is in the second state are shifted with respect to each other (the pixel shifting device can cause the first projected image and the second projected image to shift; more specifically, by the switching of state, the first projected image and the second projected image are projected to different locations, to achieve the shifting effect); and a control processor, respectively coupled to the image light generating device and the pixel shifting device, wherein the control processor controls the pixel shifting device to perform a switching of state, and during a time interval when the pixel shifting device performs the switching of state, controls the image light generating device to generate no image light.

In one embodiment, the image light generating device includes: a light generating device for generating a projection light; and a spatial light modulator, for receiving the projection light generated by the light generating device, and modulating the projection light based on input image signal to output the image light, wherein the control processor controls the spatial light modulator based on the input image signal to modulate the projection light.

In one embodiment, the spatial light modulator is a digital micromirror device or a Liquid Crystal On Silicon device.

In one embodiment, during the time interval when the pixel shifting device performs the switching of state, the control processor controls the spatial light modulator to be in a non-projecting state, or controls the light generating device to generate no light, whereby the image light generating device generates no image light.

In one embodiment, the light generating device includes: a light source for generating a light; a color light generating device (in some embodiment, the color light generating device is a wavelength conversion device, such as a phosphor wheel, a color wheel, etc.; in other embodiments, it can also be a filter wheel), including a plurality of color segments and a transition segment, wherein each color segment generates a projection light of a corresponding color when illuminated by the light generated by the light source; and a drive device, coupled to the color light generating device, for driving the light generating device to move periodically relative to an illumination position of the light generated by the light source formed on the color light generating device, wherein the color segments and the transition segment of the color light generating device are sequentially moved to pass the illumination position of the light generated by the light source according to a predefined order; wherein the control processor is respectively coupled to the drive device, the spatial light modulator and the pixel shifting device, for controlling a frequency of the periodic movement of the drive device, and for controlling the pixel shifting device to perform the switching of state during a time interval when the drive device drives the transition segment to move to pass the illumination position of the light generated by the light source.

An operation of the drive device driving the transition segment to move to pass the illumination position of the light generated by the light source and an operation of the pixel shifting device switching its state may be performed during a same time interval or during time intervals close to each other.

In one embodiment, the color light generating device further includes a sensing device, for generating a shifting feedback signal when the transition segment is illuminated by the light generated by the light source, and transmitting the shifting feedback signal to the control processor, wherein based on the shifting feedback signal, the control processor controls the pixel shifting device to perform the switching of state and controls the image light generating device to generate no image light on the pixel shifting device.

During the time interval when the drive device drives the transition segment to move to pass the illumination position of the light generated by the light source, the control processor controls the spatial light modulator to be in a non-projecting state, and during a time interval when the drive device drives the color segments to move to pass the illumination position of the light generated by the light source, the control processor controls the spatial light modulator to be in a projecting state; or the control processor is further coupled to the light source, and wherein during the time interval when the drive device drives the transition segment to move to pass the illumination position of the light generated by the light source, the control processor controls the light source to be off, and during a time interval when the drive device drives the color segments to move to pass the illumination position of the light generated by the light source, the control processor controls light source to be on; or the transition segment of the color light generating device includes an opaque material.

In one embodiment, the device further includes projection lenses for receiving the image light after it passes through the pixel shifting device and projecting the image light onto a screen to form an image.

In another aspect, the present invention provides a control system for a projection device (i.e. a controller processor or a control chip for the projection device).

The projection device includes: an image light generating device, for generating an image light for forming a projected image; a pixel shifting device, disposed on a transmission path of the image light generated by the image light generating device, the pixel shifting device being configured to switch its state between a first state and a second state, wherein a first projected image formed after the image light passes through the pixel shifting device when the pixel shifting device is in the first state and a second projected image formed after the image light passes through the pixel shifting device when the pixel shifting device is in the second state are shifted with respect to each other (the pixel shifting device can cause the first projected image and the second projected image to shift; more specifically, by the switching of state, the first projected image and the second projected image are projected to different locations, to achieve the shifting effect). The control system includes: a first unit for controlling the pixel shifting device to perform a switching of state, and controlling the image light generating device to generate no image light during a time interval when the pixel shifting device performs the switching of state.

In one embodiment, the image light generating device includes: a light generating device for generating a projection light; and a spatial light modulator, for receiving the projection light generated by the light generating device, and modulates the projection light based on input image signal to output the image light. The control system further includes: a second unit, for controlling the spatial light modulator based on the input image signal to modulate the projection light.

In one embodiment, the spatial light modulator is a digital micromirror device or a Liquid Crystal On Silicon device.

In one embodiment, during the time interval when the pixel shifting device performs the switching of state, the first unit controls the spatial light modulator to be in a non-projecting state, or controls the light generating device to generate no light, whereby the image light generating device generates no image light.

In one embodiment, the light generating device includes: a light source for generating a light; a color light generating device (in some embodiment, the color light generating device is a wavelength conversion device, such as a phosphor wheel, a color wheel, etc.; in other embodiments, it can also be a filter wheel), including a plurality of color segments and a transition segment, wherein each color segment generates a projection light of a corresponding color when illuminated by the light generated by the light source; and a drive device, coupled to the color light generating device, for driving the light generating device to move periodically relative to an illumination position of the light generated by the light source illuminating on the color light generating device, wherein the color segments and the transition segment of the color light generating device are sequentially moved to pass the illumination position of the light generated by the light source according to a predefined order. The control system further includes: a third unit, for determining a frequency of the periodic movement of the drive device based on a frame rate of the display image, and for controlling the drive device to move periodically based on the frequency; wherein the first unit further controls the pixel shifting device to perform the switching of state during a time interval when the drive device drives the transition segment to move to pass the illumination position of the light generated by the light source, and controls the pixel shifting device to perform no switching of state during a time interval when the drive device drives the color segment to move to pass the illumination position of the light generated by the light source.

In one embodiment, an operation of the drive device driving the transition segment to move to pass the illumination position of the light generated by the light source and an operation of the pixel shifting device switching its state are performed during a same time interval or during time intervals close to each other.

In one embodiment, the color light generating device further includes a sensing device, for generating a shifting feedback signal when the transition segment is illuminated by the light generated by the light source, and transmitting the shifting feedback signal to the first unit of the control system, wherein based on the shifting feedback signal, the first unit of the control system controls the pixel shifting device to perform the switching of state and controls the image light generating device to generate no image light on the pixel shifting device.

In one embodiment, during the time interval when the drive device drives the transition segment to move to pass the illumination position of the light generated by the light source, the first unit controls the spatial light modulator to be in a non-projecting state, and during a time interval when the drive device drives the color segments to move to pass the illumination position of the light generated by the light source, the first unit controls the spatial light modulator to be in a projecting state; or wherein during the time interval when the drive device drives the transition segment to move to pass the illumination position of the light generated by the light source, the first unit controls the light source to be off, and during a time interval when the drive device drives the color segments to move to pass the illumination position of the light generated by the light source, the first unit controls light source to be on.

In one embodiment, the device further includes projection lenses for receiving the image light after it passes through the pixel shifting device and projecting the image light onto a screen to form an image.

In a third aspect, the present invention provides a projection control method, which includes the following steps.

Controlling a spatial light modulator based on input image signal to modulate an input light and output an image light.

Passing the image light through a pixel shifting device to generate a projection light.

Controlling the pixel shifting device to switch its state between a first state and a second state, wherein a first projected image formed after the image light passes through the pixel shifting device when the pixel shifting device is in the first state and a second projected image formed after the image light passes through the pixel shifting device when the pixel shifting device is in the second state are shifted with respect to each other, and preventing the image light from passing through the pixel shifting device during a time interval when the pixel shifting device performs the switching of state.

In the above projection control method, the method of preventing the image light from passing through the pixel shifting device includes: controlling the spatial light modulator to be in a non-projecting state; or controlling the input light to turn off.

An advantage of the embodiments of the present invention is that, because during the time interval when the pixel shifting device is performing the switching operation, no light passes through the pixel shifting device, the degradation of the contrast of the projected image is prevented.

DETAILED DESCRIPTION OF PREFERRED EMBODIMENTS

Embodiments of the present invention are described in detail below with reference to the drawings.

A DLP projection device commonly includes a light generating device, a spatial light modulator, projection lenses and a control processor. The light generating device generates a light sequence of multiple different colored monochromatic lights in a predetermined time sequence. The controller processor convers video signal of each frame to multiple single-color image signals, and controls the spatial light modulator to modulate the input light sequence based on the multiple single-color image signals. When a pixel shifting device is implemented in the DLP projection device, the inventors of this invention discovered that the pixel shifting device has an adverse impact on the contrast of the projected image. Through study, the inventors discovered that during the time interval the pixel shifting device switches its states, if the light is illuminated on the pixel shifting device, it will cause the image contrast to decrease, which lowers the image quality of the display. The inventors further discovered that various control techniques may be employed such than during the time interval when the pixel shifting device is switching its state, no light is illuminated on the pixel shifting device; and after the state switching of the pixel shifting device is completed, the light may be controlled to illuminate the pixel shifting device normally. This way, the image resolution is improved by using the pixel shifting device with state switching, and at the same time, the contrast is not adversely impacted.

First Embodiment

Figure 1:
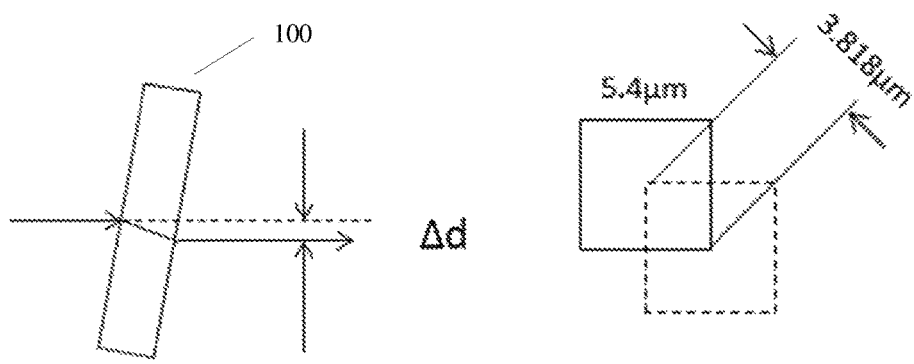
FIG. 1 schematically illustrates the working principle of a conventional pixel shifting device.
Figure 2:
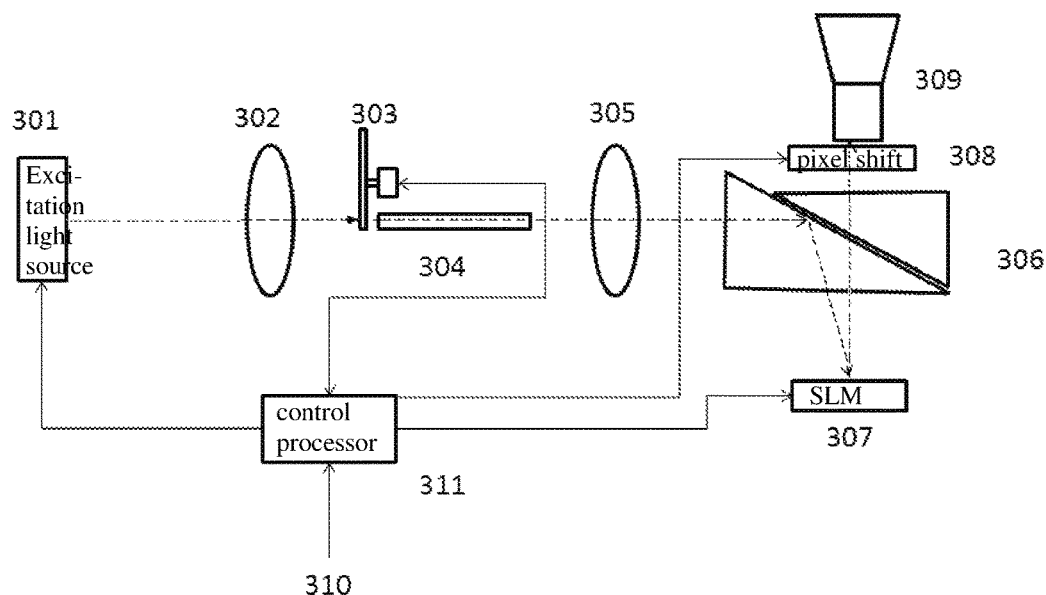
FIG. 2 schematically illustrates the structure of a projection device according to a first embodiment of the present invention.

FIG. 2 schematically illustrates the structure of a projection device according to a first embodiment of the present invention. The projection device includes an excitation light source 301, a wavelength conversion device 303 which receives the excitation light illuminated on it and converts the excitation light to converted lights, a spatial light modulator (SLM) 307, a pixel shifting device 308, projection lenses 309 and a control processor 311. In a preferred embodiment, the projection device may further include an input lens 302, a light shaping lens 304, an output lens 305 and a prism 306.

The excitation light source 301, the input lens 302, the wavelength conversion device 303, the light shaping lens 304 and a drive device (e.g. a motor, not shown in the drawings) together form a light generating device, which generates a periodic color light sequence, and outputs the color light sequence along a predetermined light path. This light sequence passes through the output lens 305 and the prism 306, and is inputted to the spatial light modulator 307.

In this embodiment, the wavelength conversion device may be implemented as a rotating color wheel 303, and the drive device drives the color wheel 303 to rotate, such that the color wheel 303 moves periodically relative to the excitation light illuminating on its surface. In other embodiments, the wavelength conversion device may be driven in other ways by drive devices to achieve a periodic movement of the wavelength conversion device relative to the excitation light, such as a linear oscillation.

The excitation light source 301 emits an excitation light with a relatively short wavelength, which can excite the wavelength conversion material (such as a phosphor powder) to generate a converted light. For example, the excitation light source 301 may be a blue LED (light emitting diode), a UV (ultraviolet) LED, or their arrays, or a blue LD (laser diode), a UV LD, or their arrays. In some embodiments, the excitation light source 301 may emit a white light.

The input lens 302 is disposed on the optical path between the excitation light source 301 and the color wheel 303. The input lens 302 focuses the light, so that the excitation light emitted by the excitation light source 301 is focused and incident on the color wheel 303 to form a light spot of a defined shape. In other embodiments, the excitation light source 301 and the input lens 302 may be integrated together, i.e., a input lens 302 may be formed on the light output surface of the excitation light source 301, so that the excitation light source 301 has an output light focusing function.

Figure 3:
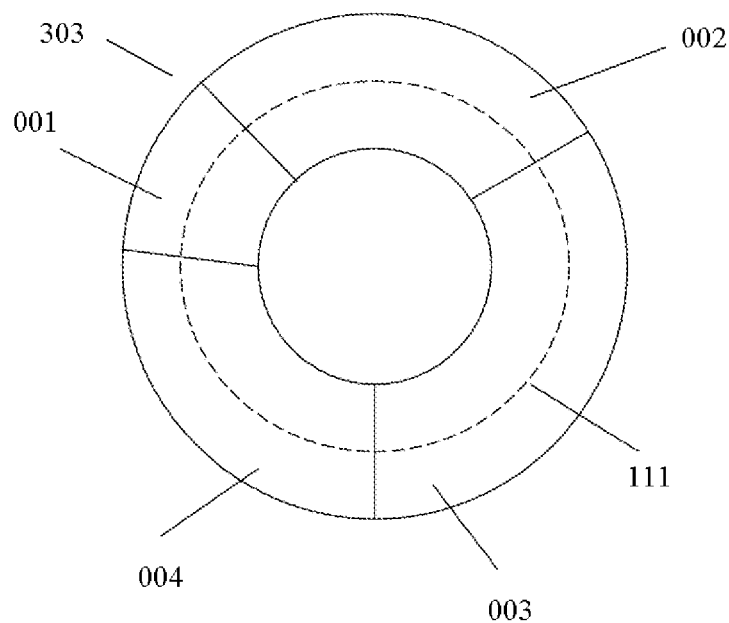
FIG. 3 schematically illustrates the structure of a color wheel used in the first embodiment.
Figure 4:
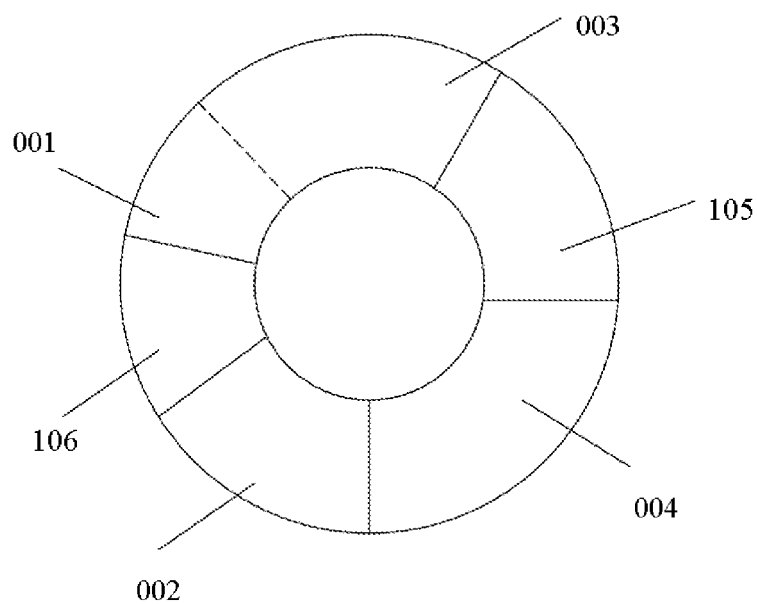
FIG. 4 schematically illustrates the structure of another color wheel used in the first embodiment.

The color wheel 303 may have a round shape, such as a ring shape or a round plate shape, or a rectangular shape, etc. In this embodiment, at least some of the regions of the color wheel 303 are color segments. The color segments are coated with or otherwise formed with at least two wavelength conversion materials; different wavelength conversion materials are formed in different regions to form different color segments. In this embodiment, there are at least two color segments. The color wheel 303 further includes a transition segment, which is located on the color wheel 303 adjacent to the color segments. FIG. 3 schematically illustrates the structure of a color wheel of this embodiment. The color wheel 303 includes the transition segment 001, a red segment 002, a green segment 003 and a blue segment 004. The transition segment 001, the red segment 002, the green segment 003 and the blue segment 004 are arranged adjacent to each other in a predefined order along a circumferential direction of the color wheel 303. The color wheel 303 further includes spoke segments, which are the border regions between adjacent color segments. The spoke segments are used to separate the materials of the adjacent color segments; smaller and more sharply defined spoke segments indicate fine manufacturing techniques of the color wheel 303. When the projection device is in an operating state, the color wheel 303 which is mounted on the motor is driven by the motor to rotate; because the color wheel 303 is disposed on the path of the excitation light and faces the excitation light, the excitation light forms an illumination light spot on the color wheel 303 which moves relative to the color wheel 303 in a circular path 111. FIG. 3 shows, only as an example, the color wheel 303 having the red segment 002, the green segment 003 and the blue segment 004; in other embodiment, the color segments may include red, green and yellow segments, or there may be only two color segments, or four or more color segments. In one example, in addition to the red, green and blue segments, the color wheel further includes a white segment and a yellow segment. In the five-color-segment example shown in FIG. 4, in addition to the transition segment 001, the red segment 002, the green segment 003, and the blue segment 004, the color wheel further includes a white segment 105 and a yellow segment 106. The transition segment 001 may include any wavelength conversion material to emit a color light when illuminated by the excitation light. The transition segment 001 may also include no wavelength conversion material, or may be coated with a non-transparent material. The excitation light emitted by the excitation light source 301 is focused by the input lens 302 to form a light spot on the color wheel 303; the wavelength conversion material illuminated by the light spot converts the excitation light to a converted light having a wavelength corresponding to the wavelength conversion material. Because the position of the light spot is fixed relative to the rotation shaft, when the color wheel 303 rotates around the shaft, the multiple color segments that are distribute in the angular direction around the axis of the shaft sequentially pass through the position illuminated by the light spot, so the wavelength conversion materials in the multiple color segments convert the excitation light to corresponding converted lights. The converted lights of multiple different colors form a periodic sequential light sequence which is output from the color wheel 303. The color wheel 303 may be a transmission type or a reflective type. In some embodiments, the single color wavelength conversion materials are coated on a substrate or mixed into the substrate to achieve wavelength conversion. Also, when the excitation light is a white light, the color wheel 303 may be implemented by appropriate color filters which change the wavelength of the white light. When the excitation light is a blue light, the blue segment of the color wheel 303 may be a blue light transmission segment that directly transmits the blue light.

Those skilled in the art would understand that the color wheel 303 may be implemented by other devices depending on the particular applications. For example, for a single-chip projection system, the color wheel 303 may include red, green and blue three primary color segments; for a two-chip projection system, the color wheel 303 may include blue and yellow segments, or cyan and red segments, or green and magenta segments. For a three-chip projection system, a blue light source can be paired with a yellow segment, or a red light source can be paired with a cyan segment, etc. For specific color wheels, the specific control method of the projection system need to be adjusted accordingly; this is familiar to those skilled in the art, and will not be described in detailed here.

The excitation light emitted by the excitation light source 301 is focused by the focusing lens 302 onto the color wheel 303. By setting the spatial relationship among the excitation light source 301, the input lens 302 and the color wheel 303, and by adjusting the parameters of the input lens 302, the position and orientation of the light spot of the excitation on the color wheel 303 can be controlled, and the light emitting efficiency and conversion efficiency can be improved.

The light shaping lens 304 is disposed on the output path of the converted light, for receiving the color light sequence including the converted lights emitted by the color wheel 303, and shaping the beam shape. The light is then focused by the output lens 305 and the light traveling direction is changed by the prism 306; the color light sequence is then incident onto the spatial light modulator 307. The color wheel 303 and the light shaping lens 304 may be integrated together, i.e., a light shaping lens 304 may be formed on the light emitting surface of the color wheel 303 to adjust the output angles of the color light sequence including the converted lights.

The spatial light modulator 307 receives the converted light from the wavelength conversion device, and modulates the converted light based on input image signals, to generate an image light. In this embodiment, the spatial light modulator 307 is a digital mirror device (or digital micromirror device, DMD). The DMD typically uses a digital micromirror chip, which can be thought of as a semiconductor light switch. Tens of thousand of micro mirrors are formed on a static random access memory (SRAM) to form a digital micromirror device, where each mirror can turn on or off the light of one pixel. The light "on" and "off" are achieved by controlling the switching of the mirror between two slanted states. For example, a slanting angle of +10 degrees may be "on" and −10 degrees may be "off" (or +12 degrees may be "on" and −12 degrees for "off", etc.). When the mirrors are not in operation, they are at a 0 degree "parking" state. The 0 degree "parking" state and the "off" state are referred to as non-projecting state. Also, by controlling the "on" time duration and speed, the brightness of the pixels can be modulated.

Figure 5:
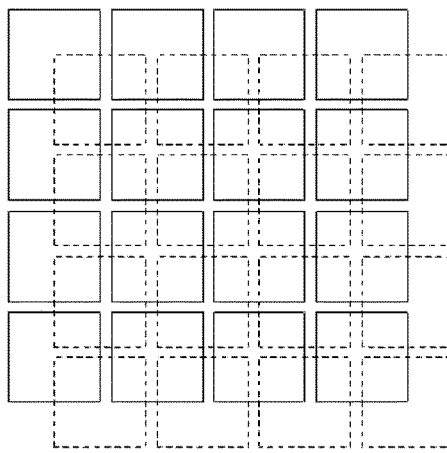
FIG. 5 schematically illustrates the effect of image projection of the first embodiment.

The pixel shifting device 308 is employed to shift the output position of the input light. It has two states, and by switching between the two states, the image formed by the projected light is shifted along a predetermined direction by a predetermined amount before and after the shifting operation. For ease of description, as shown in FIG. 5, assume that when the pixel shifting device 308 is in the first state, the image formed by the projected light after the shifting device is image A, and after the switching of state so that the pixel shifting device 308 is in the second state, the image formed by the projected light after the shifting device is image B. The shifting effect of the image A and the image B may be a shift along a diagonal direction of the image A by one half a pixel size, as shown in FIG. 5. In some embodiments, depending on the design, the image B may be shifted along the horizontal direction of the image A by one half the pixel size, or shifted along the vertical direction of the image A by one half the pixel size. The shifting amount is not limited to one half the pixel size, and may also be 1/N of the pixel size, or N times the pixel size, where N is a natural number. The pixel shifting device 308 may be a currently available product that can achieve the above function, or similar products that may become available in the future. A product manufactured by JVC may be used directly to implement the pixel shifting device 308.

The control processor 311 is the main control and processing device of the projector device. It is used to for data processing and for controlling the various components of the projector device, and may include: a unit for determining the movement frequency of the periodic movement of the drive device based on the frame rate of the image signal to be displayed; a unit for controlling the drive device to move periodically based on the movement frequency; a unit for controlling the on and off of the excitation light source 301; a unit for receiving a feedback signal from the color wheel 303; a unit for processing the digital or analog video or image signal into red, green and blue (RGB) data, formatting the RGB data into bitmap data and writing it into the memory of the spatial light modulator 307, thereby controlling the motion of the pixel mirrors of the spatial light modulator 307; and a unit for controlling the switching of state of the pixel shifting device 308.

The projection lenses 309 is used to receive the image light that has passed through the pixel shifting device 308 and project it onto the screen to form the image.

The operation principle of the projection device of this embodiment is described below.

The video signal 310 is inputted to the control processor 311. The control processor 311 processes the video signal 310 into digital signal of the RGB format and writes the data into the spatial light modulator 307. Initially, the pixel shifting device 308 is in the first state, and the control processor 311 controls the color wheel 303 to rotate. As shown in FIGS. 2 and 3, when the drive device drives the color segments to moved into the illumination position of the excitation light, the control processor 311 controls the excitation light source 301 to turn on and emit the excitation light; the excitation light is focused by the input lens 302 to be incident on the color wheel 303, to form a light spot on the color wheel 303. When the color wheel is rotated to a position where the light spot is located in the red segment 002, the control processor 311 controls the spatial light modulator 307 to display the red image data; when the color wheel is rotated to a position where the light spot is located in the green segment 003, the control processor 311 controls the spatial light modulator 307 to display the green image data; and when the color wheel is rotated to a position where the light spot is located in the blue segment 004, the control processor 311 controls the spatial light modulator 307 to display the blue image data; this completes the display of one frame of RGB image. Because of the effect of persistence of vision, the viewer perceives the image A located at the position indicated by the solid lines in FIG. 5.

Then, when the color wheel is rotated to a position where the light spot is located in the transition segment 001, the control processor 311 controls the excitation light source 301 to turn off, and controls the pixel shifting device 308 to perform a state switching operation, to switch the state of the pixel shifting device 308 to the second state. Thus, in this state, the image formed by the projected light after passing through the pixel shifting device 308, as compared to the image A, is shifted by one half the pixel size in the diagonal direction. By setting the angular range of the transition segment 001 on the color wheel and the switching speed of the pixel shifting device 308, the operation of the drive device driving the transition segment to move and pass the illumination position of the excitation light and the switching operation of the pixel shifting device 308 to occur within the same time interval or in time intervals close to each other, so that when the shifting operation of the pixel shifting device 308 is completed, the color wheel rotates by exactly one revolution such that the illumination spot is located in the red segment again. Thus, by repeating the above process, when the color wheel 303 is rotated to a position where the light spot is located in the red segment 002, the control processor 311 controls the spatial light modulator 307 to display the red image data; when the color wheel is rotated to a position where the light spot is located in the green segment 003, the control processor 311 controls the spatial light modulator 307 to display the green image data; and when the color wheel is rotated to a position where the light spot is located in the blue segment 004, the control processor 311 controls the spatial light modulator 307 to display the blue image data; this completes the display of one frame of RGB image, and the image perceived by the viewer is the image B located at the position indicated by the dashed lines in FIG. 5. When the color wheel 303 again rotates to a position where the light spot is located in the transition segment 001, the control processor 311 again controls the excitation light source 301 to turn off, and controls the pixel shifting device 308 to perform a state switching operation, so that the pixel shifting device 308 is in the first state. The above process is repeated to display a continuous image.

When the color wheel 303 rotates, the light beam of the red, green and blue color light sequence is sequentially input into the digital micromirror chip; when the red light is input into the digital micromirror chip, some mirrors are turned to an "on" position based on the pixel position and intensity of the red image data; the green and blue light and image data operate the same way. The light beam after reflection by the digital micromirror chip is passed through the pixel shifting device 308, and is then projected onto the screen by the projection lenses 309. The human vision system integrates the red, green and blue information on the screen to perceive a full color image. The image A is superimposed on the shifted image B, so that the perceived pixel size is smaller, and the perceived image is clearer, so as to increase the perceived spatial resolution of the image display. When the resolution of the spatial light modulator 307 is 2K1K, by using the above control, a display having the effect of a 4K2K image is accomplished.

Those skilled in the art will appreciate that, the image A and the image B are not limited to shifting by one half of the pixel size in the diagonal direction; the image B may be shifted by one half of the pixel size in the horizontal direction, or the image B may be shifted by one half the pixel size in the vertical direction.

In one embodiment, the control processor 311 controls the excitation light source 301 and the pixel shifting device 308 to be synchronized, i.e., in the time interval when the pixel shifting device 308 is performing the switching operation, the excitation light source 301 is turned off; outside of the time interval when the pixel shifting device 308 is performing the switching operation, the excitation light source 301 is turned on. The timing of the excitation light source 301 and the pixel shifting device 308 can be set beforehand to achieve the effect of the present invention.

In one embodiment, the control processor 311 controls the color wheel 303, the excitation light source 301 and the pixel shifting device 308 to be synchronized, i.e., when the color wheel 303 is rotated such that the color segments are moved into the illumination position of the excitation light, the excitation light source 301 is turned on, and when the color wheel 303 is rotated such that the transition segment 001 is moved into the illumination position of the excitation light, the excitation light source 301 is turned off and the pixel shifting device 308 is controlled to perform the switching operation. The timing of the color wheel 303, the excitation light source 301, and the pixel shifting device 308 can be set beforehand to achieve the effect of the present invention.

In one embodiment, the color wheel 303 is additionally provided with a sensing device, so that when the transition segment is illuminated by the excitation light, the sensing device generates a shifting feedback signal and transmits the shifting feedback signal to the control processor 311. When the control processor 311 receives the shifting feedback signal, it controls the pixel shifting device 308 to perform a state switching and controls the excitation light source 301 to turn off, so that during the time interval when the pixel shifting device 308 is performing the switching operation, no image light is incident to the pixel shifting device.

In this embodiment, when the transition segment 001 of the color wheel 303 moves and passes through the illumination position of the excitation light, the excitation light source 301 is turned off, which prevents the excitation light source 301 from continuously emitting and saves energy. In particular, for a projection device that employs DLP technology, because the pixel shifting device has a relatively slow switching operation, the off time of the excitation light source 301 is relatively long, which can save more energy. Meanwhile, because during the time interval when the transition segment 001 of the color wheel 303 passes through the illumination position of the excitation light, the pixel shifting device 308 performs state switching, and no light transmits through the pixel shifting device 308, degradation of contrast of the projected image is prevented. Thus, the image perceived by the viewer is clearer, enhancing the visual experience of the viewer.

Those skilled in the art will appreciate that, when the transition segment 001 of the color wheel 303 is made of an opaque material, it is not necessary to turn off the excitation light source 301 during the time interval when the transition segment 001 moves to pass the illumination position of the excitation light. In this case, during the time interval when the pixel shifting device 308 performs state switching, no light transmits through the pixel shifting device 308, degradation of contrast of the projected image is likewise prevented. Thus, the image perceived by the viewer is clearer, enhancing the visual experience of the viewer.

Second Embodiment

Figure 6:
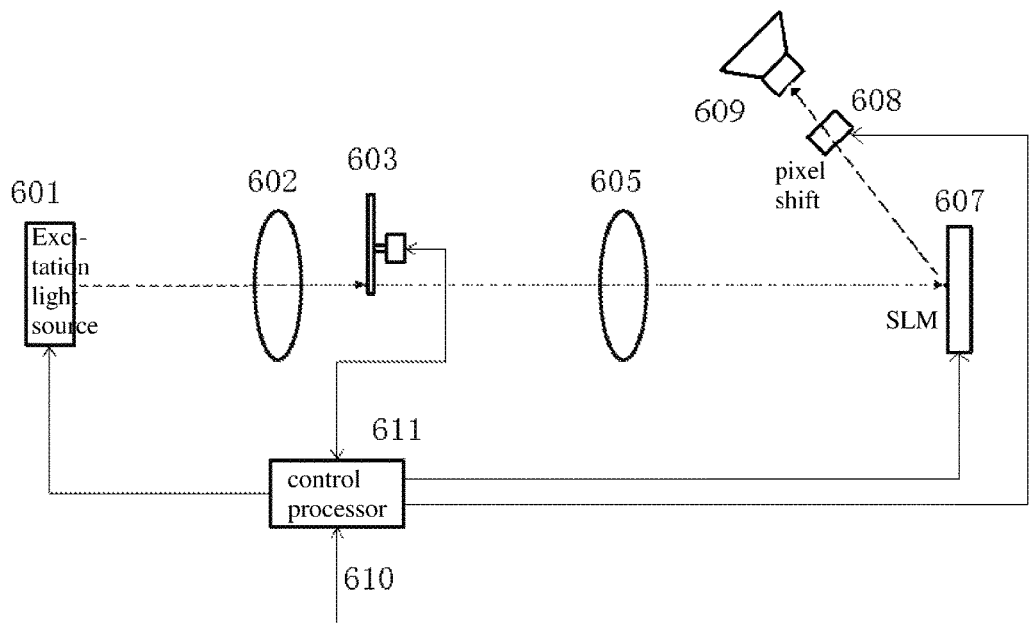
FIG. 6 schematically illustrates the structure of a projection device according to a second embodiment of the present invention.

FIG. 6 schematically illustrates the structure of a projection device according to this embodiment. The projection device includes an excitation light source 601, an input lens 602, a wavelength conversion device 603, a light shaping device 605, a spatial light modulator 607, a pixel shifting device 608, projection lenses 609 and a control processor 611.

Figure 7:
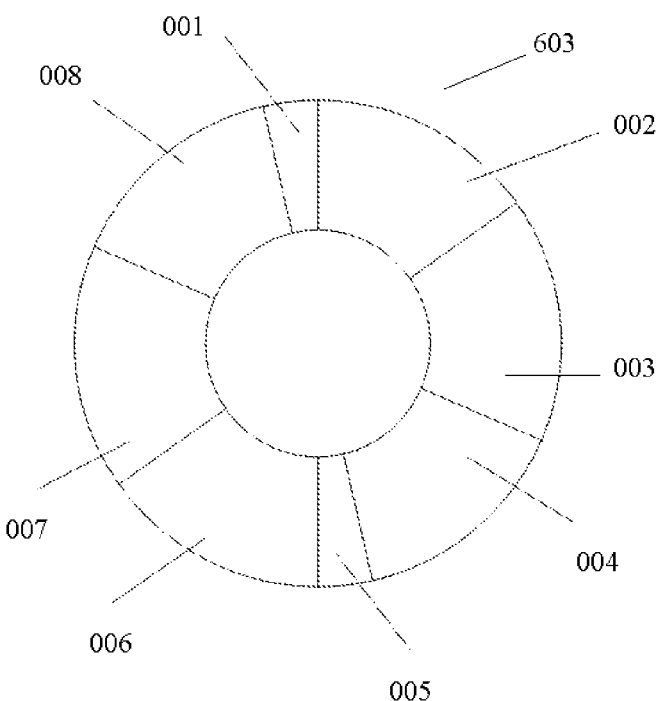
FIG. 7 schematically illustrates the structure of a color wheel used in the second embodiment.

One main difference between this embodiment and the first embodiment is that, the wavelength conversion device 603 of this embodiment is color wheel having a structure shown in FIG. 7, which includes a first transition segment 001, a first red segment 002, a first green segment 003, a first blue segment 004, a second transition segment 005, a second red segment 006, a second green segment 007, and a second blue segment 008. The first transition segment 001, the first red segment 002, the first green segment 003, and the first blue segment 004 are respectively located at locations symmetrical with respect to the central axis to the second transition segment 005, the second red segment 006, the second green segment 007, and the second blue segment 008. This arrangement can achieve better color effects of the projected image.

The operation principle of the projection device of this embodiment is described below.

The video signal 610 is inputted to the control processor 611. The control processor 611 controls the color wheel 603 to rotate. As shown in FIGS. 6 and 7, initially, the pixel shifting device 608 is in the first state, and when the drive device drives the color segments to moved into the illumination position of the excitation light, the control processor 611 controls the excitation light source 601 to turn on and emit the excitation light. The excitation light is focused by the input lens 602 to be incident on the color wheel 603, to form a light spot on the color wheel 603. When the color wheel is rotated to a position where the light spot is located in the first red segment 002, the control processor 611 controls the spatial light modulator 607 to display the red image data; when the color wheel 603 is rotated to a position where the light spot is located in the first green segment 003, the control processor 611 controls the spatial light modulator 607 to display the green image data; and when the color wheel 603 is rotated to a position where the light spot is located in the first blue segment 004, the control processor 611 controls the spatial light modulator 607 to display the blue image data; this completes the display of one frame of RGB image. Because of the effect of persistence of vision, the viewer perceives the image A located at the position indicated by the solid lines in FIG. 5.

Then, when the color wheel is rotated to a position where the light spot is located in the second transition segment 005, the control processor 611 controls the excitation light source 601 to turn off, controls the spatial light modulator 607 to be in a dark field, and controls the pixel shifting device 608 to perform a state switching operation, to switch the state of the pixel shifting device 608 to the second state. Thus, in this state, the image formed by the projected light after passing through the pixel shifting device 608, as compared to the image A, is shifted by one half the pixel size in the diagonal direction. By setting the angular range of the second transition segment 005 on the color wheel and the switching speed of the pixel shifting device 608, it is ensured that when the shifting operation of the pixel shifting device 608 is completed, the color wheel just rotates to a position where the illumination position is located in the second red segment 006. Likewise, by repeating the above process, when the color wheel 603 is rotated to a position where the light spot is located in the second red segment 006, the control processor 611 controls the spatial light modulator 607 to display the red image data; when the color wheel 603 is rotated to a position where the light spot is located in the second green segment 007, the control processor 611 controls the spatial light modulator 607 to display the green image data; and when the color wheel 603 is rotated to a position where the light spot is located in the blue segment 008, the control processor 611 controls the spatial light modulator 607 to display the blue image data; this completes the display of one frame of RGB image, and the image perceived by the viewer is the image B located at the position indicated by the dashed lines in FIG. 5. This completes the display of a 4K2K image.

The image A and the shifted image B are sequentially projected by the projection lenses 309 onto the screen, so that as perceived by the viewer, the image A and the image B are superimposed, which achieves the effect of a clearer image for the viewer.

The color wheel 603 continues to rotate to a position where the light spot is located in the first transition segment 001, the control processor 611 controls the excitation light source 601 to turn off, controls the spatial light modulator 607 to be in a dark field, and controls the pixel shifting device 608 to perform a state switching operation, to switch the state of the pixel shifting device 608 to the first state. When the shifting operation of the pixel shifting device 608 is completed, the color wheel 603 just rotates to a position where the illumination position is located in the first red segment 002. The process is repeated. As a result, the viewer perceives a clearer image continuously.

In this embodiment, when the transition segment 001 of the color wheel 603 moves and passes through the illumination position of the excitation light, the excitation light source 601 is turned off, which prevents the excitation light source 601 from continuously emitting and saves energy. In particular, for a projection device that employs DLP technology, because the pixel shifting device has a relatively slow switching operation, the off time of the excitation light source is relatively long, which can save more energy. Meanwhile, because during the time interval when the transition segment 001 of the color wheel 603 passes through the illumination position of the excitation light, the pixel shifting device 608 performs state switching, and no light transmits through the pixel shifting device 608, degradation of contrast of the projected image is prevented. Thus, the image perceived by the viewer is clearer, enhancing the visual experience of the viewer.

Third Embodiment

Figure 8:
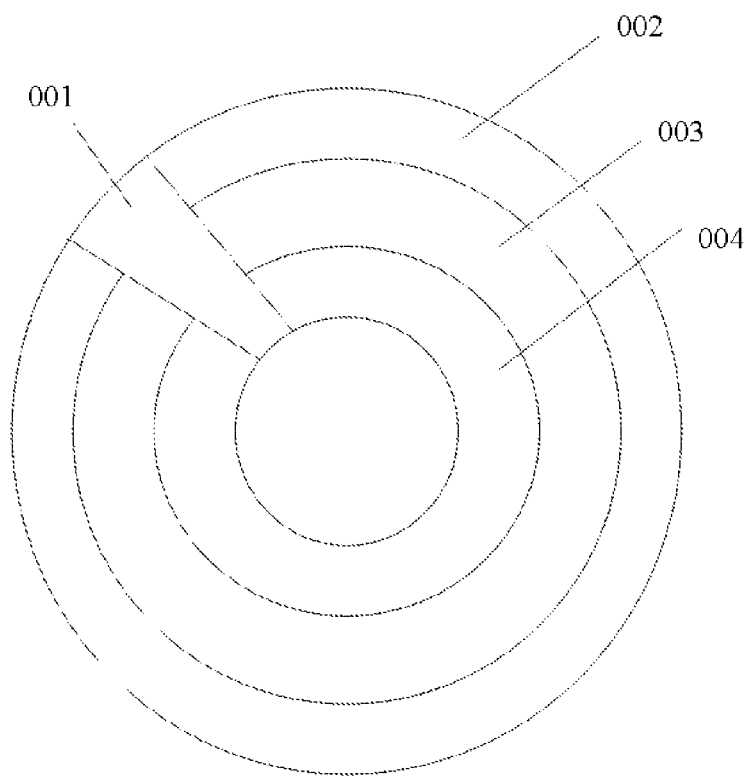
FIG. 8 schematically illustrates the structure of a color wheel used in a third embodiment of the present invention.

Those skilled in the art will appreciate that the projection device of various embodiments of the present invention may use any other suitable types of color wheels, such as ring shaped wheel or gain type color wheels. FIG. 8 schematically illustrates the structure of a ring shaped color wheel according to a third embodiment, which includes a transition segment 001, a red segment 002, a green segment 003 and a blue segment 004; each color segment is a part of a ring shaped band, and the multiple segments are arranged concentrically and distributed in the radial direction. The transition segment 001 is a fan shaped region that extends radially across all of the ring shaped bands, so that each color segment is a ring shaped band with a notch. Correspondingly, the excitation light source emits three independent excitation light beams, which are focused by focusing lenses onto the color wheel forming three light spots respectively located within the three color segments. The three color segments respectively absorb the corresponding excitation light to generate three beams of converted light, i.e., red converted light, green converted light and blue converted light.

The three converted light beams are respectively modulated by the spatial light modulator unit to form three projection light beams, which are combined by a light combination device to obtain a mixed projection light including red, green and blue components. The mixed projection light is passed through the pixel shifting device and projected by the projection lenses to form an image.

Alternatively, the three beams of converted light may be combined by a light combination device first to form a mixed converted light beam including red, green and blue components, and the mixed converted light is modulated by the spatial light modulator to form a projection light. The projection light is passed through the pixel shifting device and projected by the projection lenses to form an image.

Those skilled in the art will appreciate that the working principles of the projection device employing the ring shaped color wheel of this embodiment are similar to those of the first and second embodiments, and detailed descriptions are omitted here. Briefly, when the light spots of the excitation lights are located in the transition segment 001, the pixel shifting device performs its state switching operation.

Further, those skilled in the art will appreciate that for single-chip, two-chip and three-chip projection systems, their specific control schemes are designed based on the requirements of the projection system. For example, for a single-chip projection system, if the color wheel is one that includes a red, a green and a blue ring, then the excitation light sources corresponding to the red, green and blue rings should be turned on at different times sequentially, so that the wavelength conversion device sequentially outputs red, green and blue lights in a time sequence. For a two-chip system, the color wheel may include a blue ring and a yellow ring, and the corresponding excitation light sources for the blue and yellow rings are turned on at different times sequentially, so that the wavelength conversion device sequentially outputs blue and yellow lights in a time sequence. For a three-chip system, the color wheel may include a red, a green and a blue ring, and the corresponding three excitation light sources are turned on simultaneously, such that the wavelength conversion device simultaneously outputs red, green and blue lights. These schemes are known to those skilled in the art and will not be described in more detail here.

Fourth Embodiment

Figure 9:
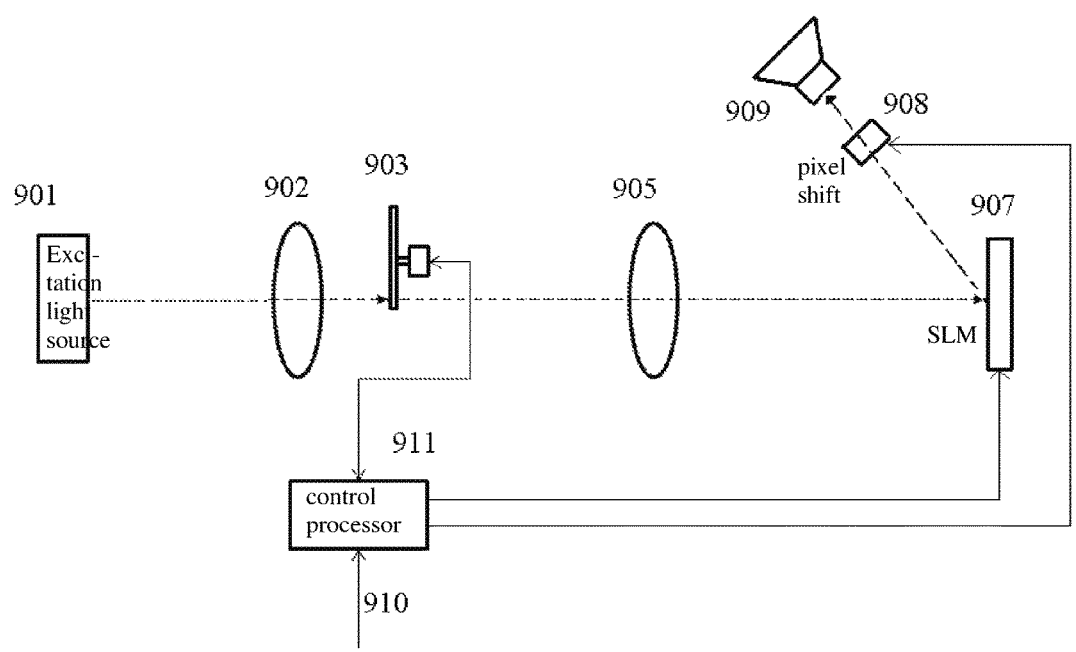
FIG. 9 schematically illustrates the structure of a projection device according to a fourth embodiment of the present invention.

FIG. 9 schematically illustrates the structure of a projection device according to this embodiment. The projection device includes an excitation light source 901, an input lens 902, a wavelength conversion device 903, a light shaping device 905, a spatial light modulator 907, a pixel shifting device 908, projection lenses 909 and a control processor 911.

The wavelength conversion device is a color wheel, which includes a red segment, a green segment and a blue segment arranged adjacent to each other in a predefined sequence along a circumferential direction of the color wheel.

The operation principle of the projection device of this embodiment is described below.

The video signal 910 is inputted to the control processor 911. The control processor 911 controls the color wheel 903 to rotate. As shown in FIG. 9, initially, the pixel shifting device 908 is in the first state, and when the drive device drives the color segments to moved into the illumination position of the excitation light, the excitation light is focused by the input lens 902 to be incident on the color wheel 903, to form a light spot on the color wheel 903. When the color wheel is rotated to a position where the light spot is located in the red segment, the control processor 911 controls the spatial light modulator 907 to display the red image data; when the color wheel 903 is rotated to a position where the light spot is located in the green segment, the control processor 911 controls the spatial light modulator 907 to display the green image data; and when the color wheel 903 is rotated to a position where the light spot is located in the blue segment, the control processor 911 controls the spatial light modulator 907 to display the blue image data; this completes the display of one frame of RGB image. Because of the effect of persistence of vision, the viewer perceives the image A located at the position indicated by the solid lines in FIG. 5.

Then, when the color wheel 903 is rotated to a position where the light spot is located in the transition segment, the control processor controls the spatial light modulator 907 to be in a dark field, and controls the pixel shifting device 908 to perform a state switching operation, to switch the state of the pixel shifting device 908 to the second state. Thus, in this state, the image formed by the projected light after passing through the pixel shifting device 908, as compared to the image A, is shifted by one half of the pixel size in the diagonal direction. Here, dark field refers to an operation of the DMD where the DMD reflects the input light, so that the reflected light will not enter the pixel shifting device and the projection lenses, i.e., the DMD is in a non-projecting state. By setting the angular range of the transition segment on the color wheel and the switching speed of the pixel shifting device 908, it is ensured that when the shifting operation of the pixel shifting device 908 is completed, the color wheel just rotates to a position where the light spot is located in the red segment. The above process is repeated.

The image A and the shifted image B are sequentially projected by the projection lenses 909 onto the screen, so that as perceived by the viewer, the image A and the image B are superimposed, which achieves the effect of a clearer image for the viewer.

In one embodiment, the control processor 911 controls the spatial light modulator 907 and the pixel shifting device 308 to be synchronized, i.e., in the time interval when the pixel shifting device 308 is performing the switching operation, the spatial light modulator 907 is in a non-projecting state; outside of the time interval when the pixel shifting device 308 is performing the switching operation, the spatial light modulator 907 is in a projecting state. The timing of the spatial light modulator 907 and the pixel shifting device 308 can be set beforehand to achieve the effect of the present invention.

In one embodiment, the control processor 911 controls the color wheel 903, the spatial light modulator 907 and the pixel shifting device 908 to be synchronized, i.e., when the color wheel 903 is rotated such that the color segments are moved into the illumination position of the excitation light, the spatial light modulator 907 is in a projecting state, and when the color wheel 903 is rotated such that the transition segment 001 is moved into the illumination position of the excitation light, the spatial light modulator 907 is in a non-projecting state and the pixel shifting device 908 performs the switching operation. The timing of the color wheel 903, the spatial light modulator 907, and the pixel shifting device 908 can be set beforehand to achieve the effect of the present invention.

In one embodiment, the color wheel 903 is additionally provided with a sensing device, so that when the transition segment is illuminated by the excitation light, the sensing device generates a shifting feedback signal and transmits the shifting feedback signal to the control processor 911. When the control processor 911 receives the shifting feedback signal, it controls the pixel shifting device 908 to perform a state switching and controls the spatial light modulator 907 to be in a dark field. Thus, during the time interval when the pixel shifting device 908 is performing switching, because the spatial light modulator 907 in in a dark field, no image light is incident to the pixel shifting device.

In this embodiment, because during the time interval when the transition segment of the color wheel 903 passes through the illumination position of the excitation light, the pixel shifting device 908 performs state switching, and since no light transmits through the pixel shifting device 908 during this time interval, degradation of contrast of the projected image is prevented. Thus, the image perceived by the viewer is clearer, enhancing the visual experience of the viewer.

It will be apparent to those skilled in the art that various modification and variations can be made in the projection device and related method of the present invention without departing from the spirit or scope of the invention. Thus, it is intended that the present invention cover modifications and variations that come within the scope of the appended claims and their equivalents.

What is claimed is:

1. A projection device, comprising:
   an image light generating device, for generating an image light for forming a projected image;
   a pixel shifting device, disposed on a transmission path of the image light generated by the image light generating device, the pixel shifting device being configured to switch its state between a first state and a second state, wherein a first projected image formed after the image light passes through the pixel shifting device when the pixel shifting device is in the first state and a second projected image formed after the image light passes through the pixel shifting device when the pixel shifting device is in the second state are shifted with respect to each other; and
   a control processor, respectively coupled to the image light generating device and the pixel shifting device, wherein the control processor controls the pixel shifting device to perform a switching of state to switch between the first state and the second state, and during a time interval when the pixel shifting device performs the switching of state, controls the image light generating device to generate no image light.

2. The projection device of claim 1, wherein the image light generating device comprises:

a light generating device for generating a projection light; and
a spatial light modulator, for receiving the projection light generated by the light generating device, and modulating the projection light based on input image signal to output the image light,
wherein the control processor controls the spatial light modulator based on the input image signal to modulate the projection light.

3. The projection device of claim 2, wherein the spatial light modulator is a digital micromirror device or a Liquid Crystal On Silicon device.

4. The projection device of claim 2, wherein during the time interval when the pixel shifting device performs the switching of state, the control processor controls the spatial light modulator to be in a non-projecting state, or controls the light generating device to generate no light, whereby the image light generating device generates no image light.

5. The projection device of claim 4, wherein the light generating device comprises:
a light source for generating a light;
a color light generating device, including a plurality of color segments and a transition segment, wherein each color segment generates a projection light of a corresponding color when illuminated by the light generated by the light source; and
a drive device, coupled to the color light generating device, for driving the light generating device to move periodically relative to an illumination position of the light generated by the light source formed on the color light generating device, wherein the color segments and the transition segment of the color light generating device are sequentially moved to pass the illumination position of the light generated by the light source according to a predefined order;
wherein the control processor is respectively coupled to the drive device, the spatial light modulator and the pixel shifting device, for controlling a frequency of the periodic movement of the drive device, and for controlling the pixel shifting device to perform the switching of state during a time interval when the drive device drives the transition segment to move to pass the illumination position of the light generated by the light source.

6. The projection device of claim 5, wherein an operation of the drive device driving the transition segment to move to pass the illumination position of the light generated by the light source and an operation of the pixel shifting device switching its state are performed during a same time interval or during time intervals close to each other.

7. The projection device of claim 6, wherein the color light generating device further includes a sensing device, for generating a shifting feedback signal when the transition segment is illuminated by the light generated by the light source, and transmitting the shifting feedback signal to the control processor, wherein based on the shifting feedback signal, the control processor controls the pixel shifting device to perform the switching of state and controls the image light generating device to generate no image light on the pixel shifting device.

8. The projection device of claim 5,
wherein during the time interval when the drive device drives the transition segment to move to pass the illumination position of the light generated by the light source, the control processor controls the spatial light modulator to be in a non-projecting state, and during a time interval when the drive device drives the color segments to move to pass the illumination position of the light generated by the light source, the control processor controls the spatial light modulator to be in a projecting state;
or wherein the control processor is further coupled to the light source, and wherein during the time interval when the drive device drives the transition segment to move to pass the illumination position of the light generated by the light source, the control processor controls the light source to be off, and during a time interval when the drive device drives the color segments to move to pass the illumination position of the light generated by the light source, the control processor controls light source to be on;
or wherein the transition segment of the color light generating device includes an opaque material.

9. The projection device of claim 1, further comprising projection lenses for receiving the image light after it passes through the pixel shifting device and projecting the image light onto a screen to form an image.

10. A control system for a projection device, wherein the projection device comprises:
an image light generating device, for generating an image light for forming a projected image;
a pixel shifting device, disposed on a transmission path of the image light generated by the image light generating device, the pixel shifting device being configured to switch its state between a first state and a second state, wherein a first projected image formed after the image light passes through the pixel shifting device when the pixel shifting device is in the first state and a second projected image formed after the image light passes through the pixel shifting device when the pixel shifting device is in the second state are shifted with respect to each other;
the control system comprising:
a first unit for controlling the pixel shifting device to perform a switching of state to switch between the first state and the second state, and controlling the image light generating device to generate no image light during a time interval when the pixel shifting device performs the switching of state.

11. The system of claim 10,
wherein the image light generating device comprises:
a light generating device for generating a projection light; and
a spatial light modulator, for receiving the projection light generated by the light generating device, and modulates the projection light based on input image signal to output the image light,
wherein the control system further comprises:
a second unit, for controlling the spatial light modulator based on the input image signal to modulate the projection light;
wherein during the time interval when the pixel shifting device performs the switching of state, the first unit controls the spatial light modulator to be in a non-projecting state, or controls the light generating device to generate no light, whereby the image light generating device generates no image light.

12. The system device of claim 11,
wherein the light generating device comprises:
a light source for generating a light;
a color light generating device, including a plurality of color segments and a transition segment, wherein each color segment generates a projection light of a corresponding color when illuminated by the light generated by the light source; and a drive device, coupled to the color light generating device, for driving the light generating device to move periodically relative to an illumination position of the light generated by the light source illuminating on the color light generating device, wherein the color segments and the transition segment of the color light generating device are sequentially moved to pass the illumination position of the light generated by the light source according to a predefined order;

wherein the control system further comprises:

a third unit, for determining a frequency of the periodic movement of the drive device based on a frame rate of the display image, and for controlling the drive device to move periodically based on the frequency;

wherein the first unit further controls the pixel shifting device to perform the switching of state during a time interval when the drive device drives the transition segment to move to pass the illumination position of the light generated by the light source.

13. The system of claim 12, wherein an operation of the drive device driving the transition segment to move to pass the illumination position of the light generated by the light source and an operation of the pixel shifting device switching its state are performed during a same time interval or during time intervals close to each other.

14. The system device of claim 12, wherein during the time interval when the drive device drives the transition segment to move to pass the illumination position of the light generated by the light source, the first unit controls the spatial light modulator to be in a non-projecting state, and during a time interval when the drive device drives the color segments to move to pass the illumination position of the light generated by the light source, the first unit controls the spatial light modulator to be in a projecting state;

or wherein during the time interval when the drive device drives the transition segment to move to pass the illumination position of the light generated by the light source, the first unit controls the light source to be off, and during a time interval when the drive device drives the color segments to move to pass the illumination position of the light generated by the light source, the first unit controls light source to be on.

15. A projection control method, comprising:

controlling a spatial light modulator based on input image signal to modulate an input light and output an image light;

passing the image light through a pixel shifting device to generate a projection light; and controlling the pixel shifting device to switch its state between a first state and a second state, wherein a first projected image formed after the image light passes through the pixel shifting device when the pixel shifting device is in the first state and a second projected image formed after the image light passes through the pixel shifting device when the pixel shifting device is in the second state are shifted with respect to each other, and preventing the image light from passing through the pixel shifting device during a time interval when the pixel shifting device performs the switching of state.

16. The method of claim 15, wherein preventing the image light from passing through the pixel shifting device includes:

controlling the spatial light modulator to be in a non-projecting state; or controlling the input light to turn off.

* * * * *